United States Patent
Hattori

(10) Patent No.: US 7,979,438 B2
(45) Date of Patent: Jul. 12, 2011

(54) DOCUMENT MANAGEMENT METHOD AND APPARATUS AND DOCUMENT SEARCH METHOD AND APPARATUS

(75) Inventor: Masakazu Hattori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1492 days.

(21) Appl. No.: 11/371,947

(22) Filed: Mar. 10, 2006

(65) Prior Publication Data
US 2006/0206527 A1   Sep. 14, 2006

(30) Foreign Application Priority Data

Mar. 11, 2005  (JP) ................................ 2005-069823

(51) Int. Cl.
*G06F 7/00* (2006.01)
(52) U.S. Cl. ..................................... 707/741; 707/736
(58) Field of Classification Search .................. 707/711, 707/739, 999.003, 999.1
See application file for complete search history.

(56) References Cited

U.S. PATENT DOCUMENTS

| | | | | |
|---|---|---|---|---|
| 5,418,951 A | * | 5/1995 | Damashek ............................ | 1/1 |
| 5,440,723 A | * | 8/1995 | Arnold et al. ...................... | 714/2 |
| 5,706,365 A | * | 1/1998 | Rangarajan et al. ........... | 707/728 |
| 5,752,051 A | * | 5/1998 | Cohen ................................ | 704/1 |
| 6,092,038 A | * | 7/2000 | Kanevsky et al. ................. | 704/9 |
| 6,131,082 A | * | 10/2000 | Hargrave et al. ................... | 704/7 |
| 6,157,905 A | * | 12/2000 | Powell ................................ | 704/2 |
| 6,473,754 B1 | * | 10/2002 | Matsubayashi et al. ............... | 1/1 |
| 6,701,318 B2 | * | 3/2004 | Fox et al. ........................ | 707/706 |
| 7,617,176 B2 | * | 11/2009 | Zeng et al. ............................ | 1/1 |
| 2006/0026152 A1 | * | 2/2006 | Zeng et al. ......................... | 707/5 |

FOREIGN PATENT DOCUMENTS

JP   2000-57151   2/2000

OTHER PUBLICATIONS

Notification of Reasons for Rejection mailed Sep. 9, 2008 in Japanese Patent Application No. 2005-069823.

* cited by examiner

*Primary Examiner* — Miranda Le
(74) *Attorney, Agent, or Firm* — Finnegan, Henderson, Farabow, Garrett & Dunner, L.L.P.

(57) ABSTRACT

A document management method includes shifting a character string of characters from document data and clipping it, determining that a management Gram obtained by the clipping is one of a first Gram of low frequency and a second Gram of high frequency, storing first post data in a first post region in association with a Gram value obtained by computing the character string of first Gram, the first post data having a set of a document identification (ID) indicating the document data including the first Gram and an intra-document offset indicating a character string position thereof, and storing second post data in a second post region in association with the character string of second Gram, the second post data having a set of a document identification (ID) indicating document data including the second Gram and an intra-document offset indicating a character string position thereof.

8 Claims, 10 Drawing Sheets

DOCUMENT MANAGEMENT METHOD AND APPARATUS AND DOCUMENT SEARCH METHOD AND APPARATUS

CROSS-REFERENCE TO RELATED APPLICATIONS

This application is based upon and claims the benefit of priority from prior Japanese Patent Application No. 2005-069823, filed Mar. 11, 2005, the entire contents of which are incorporated herein by reference.

BACKGROUND OF THE INVENTION

1. Field of the Invention

The present invention relates to a document management method for managing registered documents effectively to search a great number of documents saved in a storage for a document matching with a retrieval key word, a document search method for searching for a document, and a document management system to manage documents effectively.

2. Description of the Related Art

There is known a method of making an index at the time of saving document data in a storage to speedup retrieval when document data matching with a search key word is searched for from a set of document data saved in large quantity in a database. A method for indexing N characters in units of continuous N characters of document data is known. This is referred to as a N-Gram index system. N represents an integer more than 1 and it is conventional for a Japanese document to clip Gram in units of N=2 (Bi-Gram). It is general for an English document to clip Gram in units of more than N=3. In the case of, for example, N=2, a character string of, for example, "XML データベース" is clipped as "XM", "ML", "L デ", ""デー", ""ータ"", ""タベ"", ""ベー"", ""ース"". In retrieval of the set of document data, the search is done using Gram clipped from the retrieval key word as an index.

The N-Gram index system needs not a dictionary depended upon language and facilitates a multilingual application. It is used for Japanese, and Chinese that has no glossary delimiter such as blank in particular. If searching is done with Gram being combined with an offset (occurrence position of Gram in the document data), search loss can be reduced.

Although having such a merit, the N-Gram index system has a problem of a trade off with respect to a size of Gram (size of N). In other words, if the size of N increases, a candidate of document data corresponding to the Gram which is the index is refined, so that a retrieval speed is enhanced. A Gram information region (region for storing information on Gram in a storage) increases exponentially. In contrast, if the size of N decreases, the number of candidates of document data corresponding to the Gram increases. As a result, the number of times for collaing the position increases so that the search time increases. Further, if the size of N increases, the number of kinds of indexes (Gram classes) increases. When an index is extracted from, for example, Japanese document with N=2, the Gram classes of more than 3M-byte occurs. Accordingly, when N increases than 2, it is clear that an index data size increases further.

Japanese Patent Laid-Open No. 2000-57151 provides a method of increasing the size of N for the purpose of increasing a search speed and suppressing increase of an index data size to minimum, with respect to a problem of a trade off on the size of N. In other words, the position information of text data having the positional relation as a substring of a retrieval term is extracted by an index corresponding to the substring of the retrieval term, and the size of index corresponding to the substring of text data is compared with a predetermined reference index size. When the size of index is larger than reference index size, it is determined whether the substring corresponding to the index is most likely to be searched for. When it is most likely to be searched for, an extension character string obtained by adding a character string to the substring and an index corresponding to the extension character string are made.

According to Japanese Patent Laid-Open No. 2000-57151, if the size of N is increased, the number of Gram classes may be decreased when a long search key word is given. However, it is difficult to set precisely a reference for determining whether it is most likely that the character string corresponding to the index is searched for and increase the size of N in effect. Accordingly, there is a limit for times for registering and retrieving a document to be short.

An object of the present invention is to provide a document management method capable of achieving shortening of times for registering and searching a document while using an N-Gram index system, a document retrieval method using the same, a document management system therefor.

BRIEF SUMMARY OF THE INVENTION

An aspect of the present invention provides a document management method for managing document data stored in a document data region of a storage unit, comprising: shifting a character string of a given number of characters from document data and clipping the character string to generate a management Gram; determining that the management Gram is one of a first Gram of relatively low occurrence frequency less than a threshold and a second Gram of relatively high occurrence frequency not less than the threshold; storing first post data in a first post region of a storage unit in association with a Gram value obtained by computing the character string of the first Gram, the first post data being configured with a set of a document identification (ID) indicating the document data including the character string of the first Gram and an intra-document offset indicating a position of the character string of the first Gram; and storing second post data in a second post region of the storage unit in association with the character string of the second Gram, the second post data being configured with a set of a document identification (ID) indicating document data including the character string of the second Gram and an intra-document offset indicating a position of the character string of the second Gram.

DETAILED DESCRIPTION OF THE INVENTION

Figure 1:
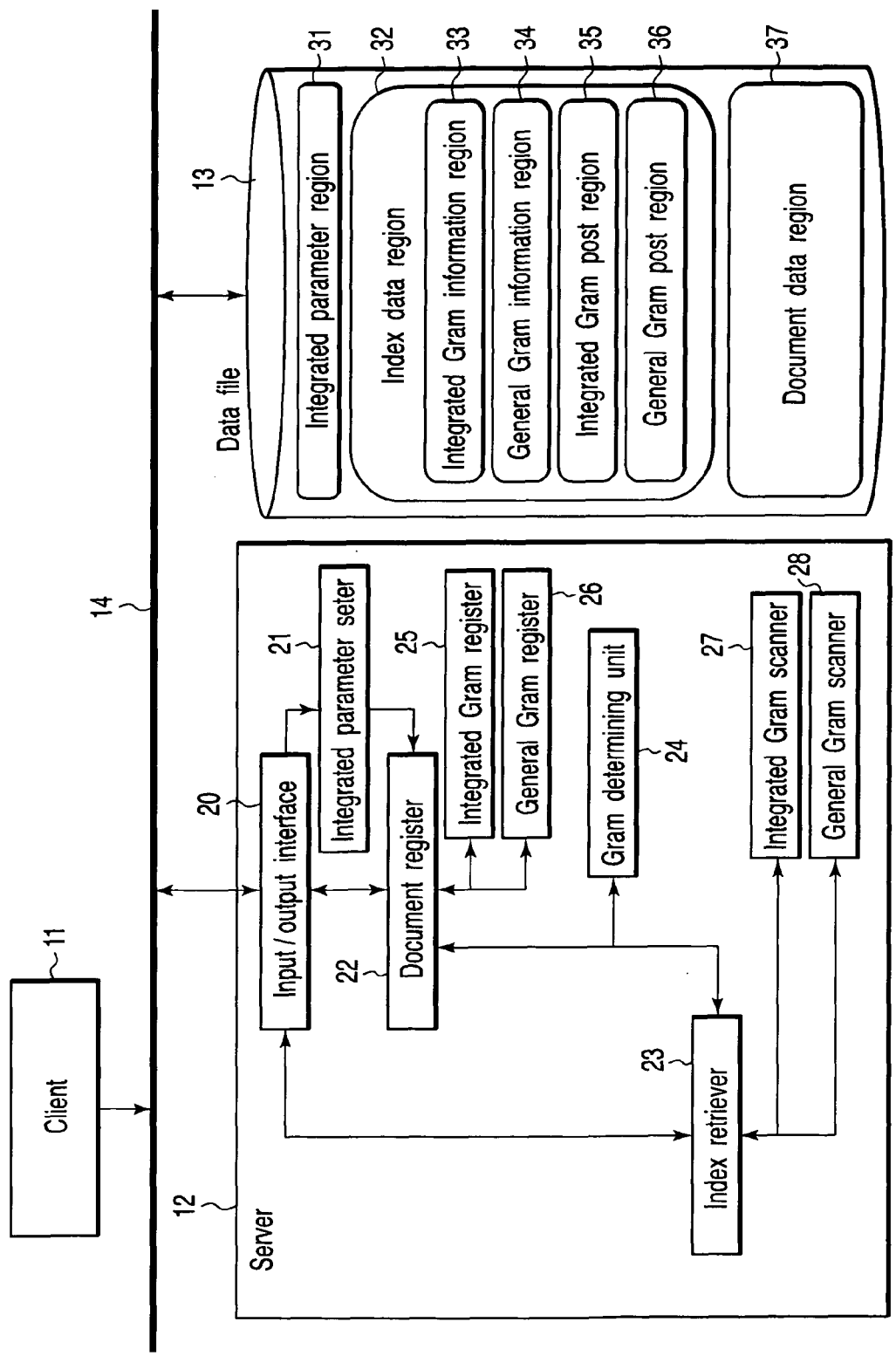
FIG. 1 is a block diagram of a document management system related to an embodiment of the present invention.

There will be described an embodiment of the present invention referring to the drawings.

<Total Configuration of a Document Management System>

As shown in FIG. 1, the document management system concerning the embodiment of the present invention comprises a client 11 and a server 12. The client 11 is a personal computer, for example. The server 12 accesses a data file 13 which is an external storage unit to register and search for a document. In other words, the document data and index data input by the client 11 are stored in the data file 13 in registering the document. A set of document data stored in the data file 13 is assumed to be an object to be searched when searching for a document. The document including a retrieval key word (referred as to a retrieval term) formed of a character string designated by the client 11 is searched for using N-Gram as an index. The client 11, server 12 and data file 13 are connected by a network 14 such as Internet. The server 12 and data file 13 may be directly connected to each other.

The client 11 issues three requests of integrated parameter setting, document registering and document searching with an index. The server 12 receives the requests via an input-output interface 20 and processes them, and returns results to the client 11. In the case of the document registering request, the data to be sent from the client 11 to the server 12 is document data. In the case of the document searching request, the data sent from the client 11 to the server 12 is a retrieval key word. The server 12 has three big processors of an integrated parameter setting unit 21, a document registering unit 22 and t an index retrieval unit 23.

The data file 13 comprises an integrated parameter region 31, an index data area 32 and a document data area 37. The index data area 32 comprises an integrated Gram information region 33, a general Gram information region 34, an integrated Gram post region 35 and a general Gram post region 36. These regions are explained in detail later.

<Server>

The server 12 is explained in detail. The integrated parameter setting unit 21 sets an integrated parameter for managing a Gram of frequency as lower as an extent which an impact is not give searching, in order to reduce the number of apparent Gram classes. A concrete example of the integrated parameter is described below.

The document registering unit 22 accesses a Gram determination unit 24, an integrated Gram registering unit 25, and a general Gram registering unit 26 to register a document. The Gram determination unit 24 determines whether the Gram (referred to as a management Gram) clipped from document data sent from the client 11 is an integrated Gram or a general Gram. As described in detail hereinafter, the integrated Gram is a Gram of relatively low occurrence frequency less than a threshold, and the general Gram is a Gram of relatively high occurrence frequency not less than the threshold aside from the integrated Gram.

In registering the document, if the determination result of the Gram determination unit 24 is the integrated Gram, the post-data corresponding to the integrated Gram is computed from the document data by the integrated Gram register 25, and stored in the integrated Gram post region 34 in the data file 13. If the determination result of the Gram determination unit 24 is a Gram aside from the integrated Gram, that is, a general Gram, the post-data corresponding to the general Gram is computed from the document data by the general Gram register 26, and stored in the general Gram post region 35 in the data file 13.

The post-data is a set of an intra-document offset of the character string and the document identification (ID) indicating document data including a character string of Gram. The document ID is ID for identifying each document data stored in the document data region 37 uniquely. The intra-document offset is information indicating the generation position of the character string of the Gram generated in the document data shown by the document ID corresponding to the intra-document offset, and is usually computed using a normal offset 0 as a starting point.

The index searcher 23 accesses the Gram determination unit 24, the integrated Gram scanner 27 and the general Gram scanner 28, and search the document data region 36 in the data file 13 for a set of document data matching with the retrieval key word sent from the client 11. In other words, the document data in the document data region 37 is searched using as an index the Gram clipped from the retrieval key word (referred to as a retrieval Gram). In this time, the Gram determination unit 24 determines whether the Gram clipped from the retrieval key ward is the integrated Gram or the general Gram.

In searching for the document, if the determination result of the Gram determination unit 24 is the integrated Gram, only the integrated Gram post region 34 in the data file 13 is scanned by the integrated Gram scanner 27 to read a post-data set corresponding to the integrated Gram. If the determination result of the Gram determination unit 24 is the general Gram, both of the integrated Gram post region 34 and general Gram post region 35 in the data file 13 are scanned by the integrated Gram scanner 27 and general Gram scanner 28, to read the post-data sets corresponding to the integrated Gram and general Gram respectively and merge them.

The index searcher 23 merges a plurality of post data sets corresponding to a plurality of Grams clipped from the retrieval key word, to obtain a set of document IDs including the retrieval key word. The index searcher 23 extracts a set of the document data by the document ID from the document data regions using the set of documents IDs including the retrieval key word finally, and send it to the client 11.

Figure 2:
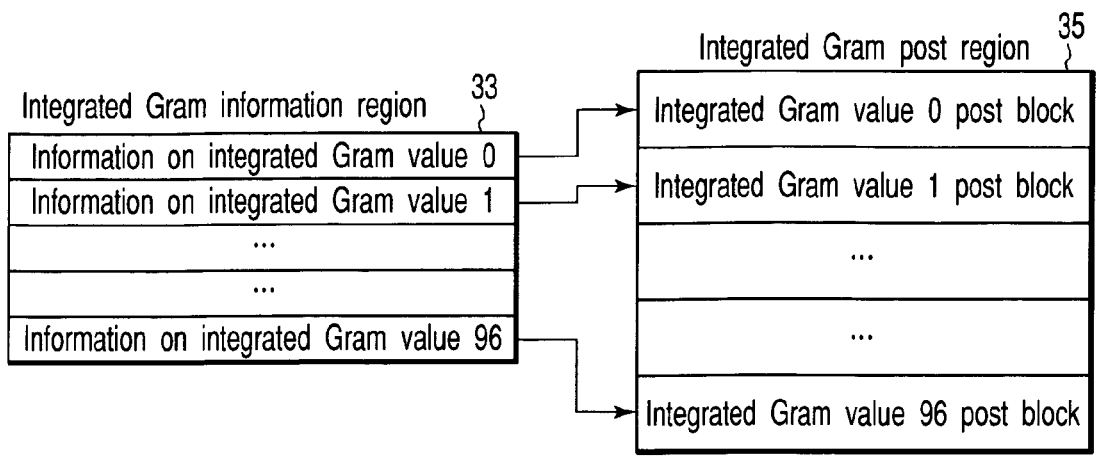
FIG. 2 is a diagram showing configuration examples of an integrated Gram information region and an integrated Gram post region according to FIG. 1.
Figure 3:
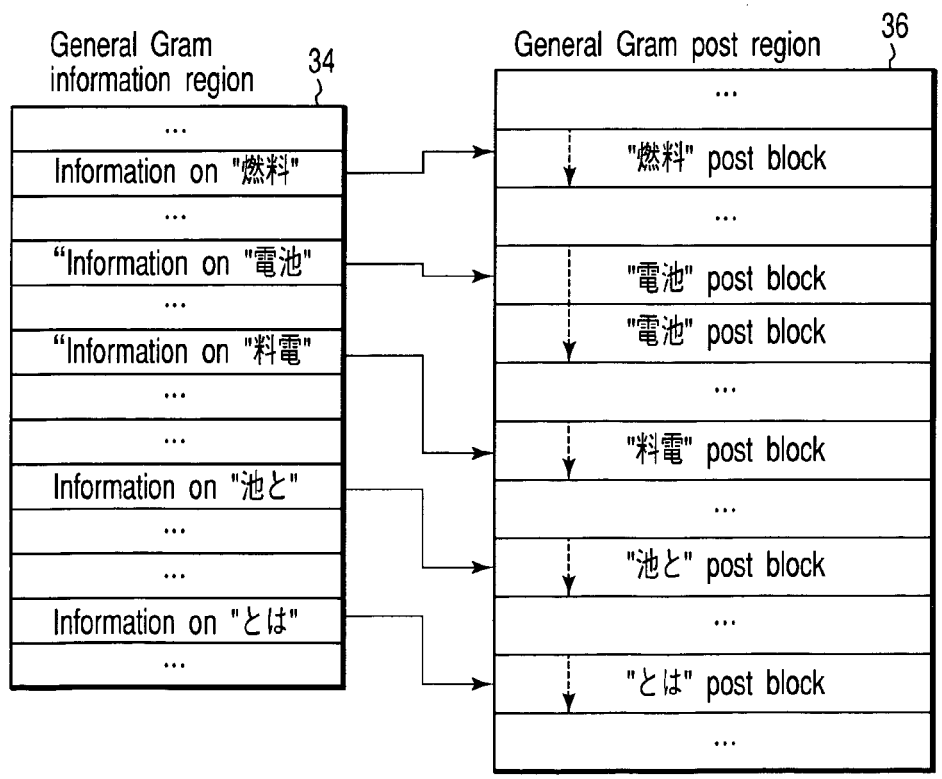
FIG. 3 is a diagram showing a configuration example of a general Gram information region and a general Gram post region according to FIG. 1.

The index data region 31 will be described referring to FIGS. 2 and 3. FIG. 2 shows configuration examples of the general Gram information region 33 and integrated Gram post region 35. FIG. 3 shows configuration examples of Gram information region 34 and general Gram post region 36.

Information on the general Grams such as "'燃料'" or "'電池'" is stored in the general Gram information region 34. The information on the general Gram represents information indicating, for example, a character string of the general Gram, a link to the head post block corresponding to the general Gram and the number of post occurrences. The number of post-occurrences represents the number of generations of Gram occurred in the document data set stored in the document data region 37.

The general Gram post region 36 includes a plurality of post-blocks each of which stores a set of post data concerning the same Gram in array form. The post-data is a set of the document ID and the intra-document offset as previously described.

The integrated Gram information region 33 stores information regarding various kinds of integrated Gram values. The integrated Gram is Gram obtained by integrating Grams of occurrence frequency as low as an extent which an impact is not given searching (Gram that the occurrence frequency is less than a threshold, referred to as low frequency Gram hereinafter). The information concerning the integrated Gram value is information indicating the integrated Gram value and a link to the head post block corresponding to the integrated Gram value.

The integrated Gram post region 35 includes a plurality of post-blocks each of which stores a set of post data corresponding to the same integrated Gram value. The post-data indicates a set of the document ID and the intra-document offset as previously described.

For example, the minimum order (V1) of low frequency Gram and the initial low frequency Gram reference (V2) (a value indicating what times of an average frequency is the occurrence frequency of Gram, that is, a multiple of an average frequency for calculating the occurrence frequency of Gram) are used as a determination reference for integrating low frequency Grams to obtain the integrated Gram.

Assuming that Gram as an object to be determined currently is Gram g and the occurrence frequency of the Gram g is $Oc(g)$. The order of Gram g in all Grams when the Grams are arranged in order of decreasing occurrence frequency is assumed to be $Rk(g)$. The average occurrence frequency of Grams is assumed to be $Oave=\Sigma gOc(g)$. If at least one of the conditions indicated by the following inequalities (1) and (2) is established, the Gram g is determined to be an integrated Gram.

$$Rk(g)<V1 \quad (1)$$

$$Oc(g)<Oave \times V2 \quad (2)$$

Figure 4:
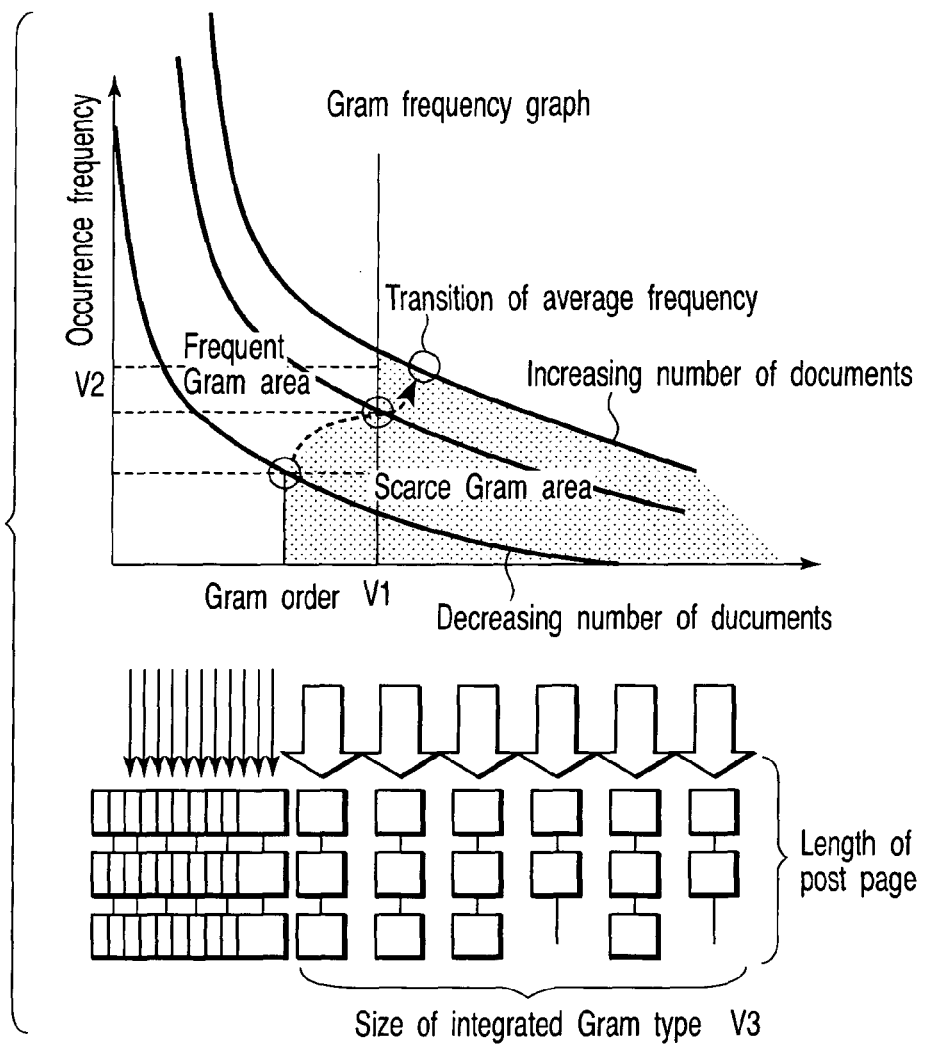
FIG. 4 is a diagram indicating a relation between the order and occurrence frequency of Gram using the number of documents as a parameter.

Referring to FIG. 4, the occurrence frequency of all Grams is very small at the initial stage that document registration is started, that is, the stage that a plurality of document data have begun to be stored in the document data region 37 (area in which the number of the documents decreases). Therefore, all Grams come to usually belong to a scarcity Gram area shown in FIG. 4 due to equation (1), and are determined to be the integrated Gram. At a stage on and after the initial stage (area including a great number of documents in FIG. 4), Grams aside from a given number of Grams belong to a frequent appearance area come to belong to a scarcity Gram area due to the equation (2), and are determined to be the integrated Gram. The difference between the low frequency Grams and the high frequency Grams is extremely greatly as shown in FIG. 4, and thus the occurrence frequency with respect to the Gram order changes in exponential curve.

The integrated Gram value is a value for specifying the integrated Gram, a hash value of a character string corresponding to Grams configuring the integrated Gram, and computed by normal hash computation. As an example, the sum of JIS codes representing, respectively, the characters of a character string corresponding to the Grams configuring the integrated Gram is calculated. It is desirable that the mod on a value V3 of this sum is assumed to be a hash value, that is, the integrated Gram value. The value V3 is a size of a class of the integrated Gram, namely the number of Grams (referred to FIG. 4).

The process of the document management system concerning the present embodiment comprises two phases: a document registration process including index registration to enable a document searching process using the Gram as an index and a document searching process using an N-Gram as an index. The document registering process is explained first.

<Document Registration Process>

Figure 5:
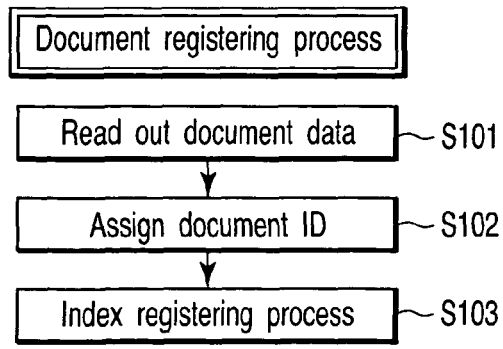
FIG. 5 is a flow chart showing a schematic procedure of a document registering process in the embodiment.

As shown in FIG. 5, a document registering process in the present embodiment comprises reading the document data to be newly stored in the document data region 37 of the data file 13 (step S101), assigning the document ID to read document data (step S102), and storing index data used in searching read document data in the index data region 33 of the data file 13 (step S103).

Figure 6:
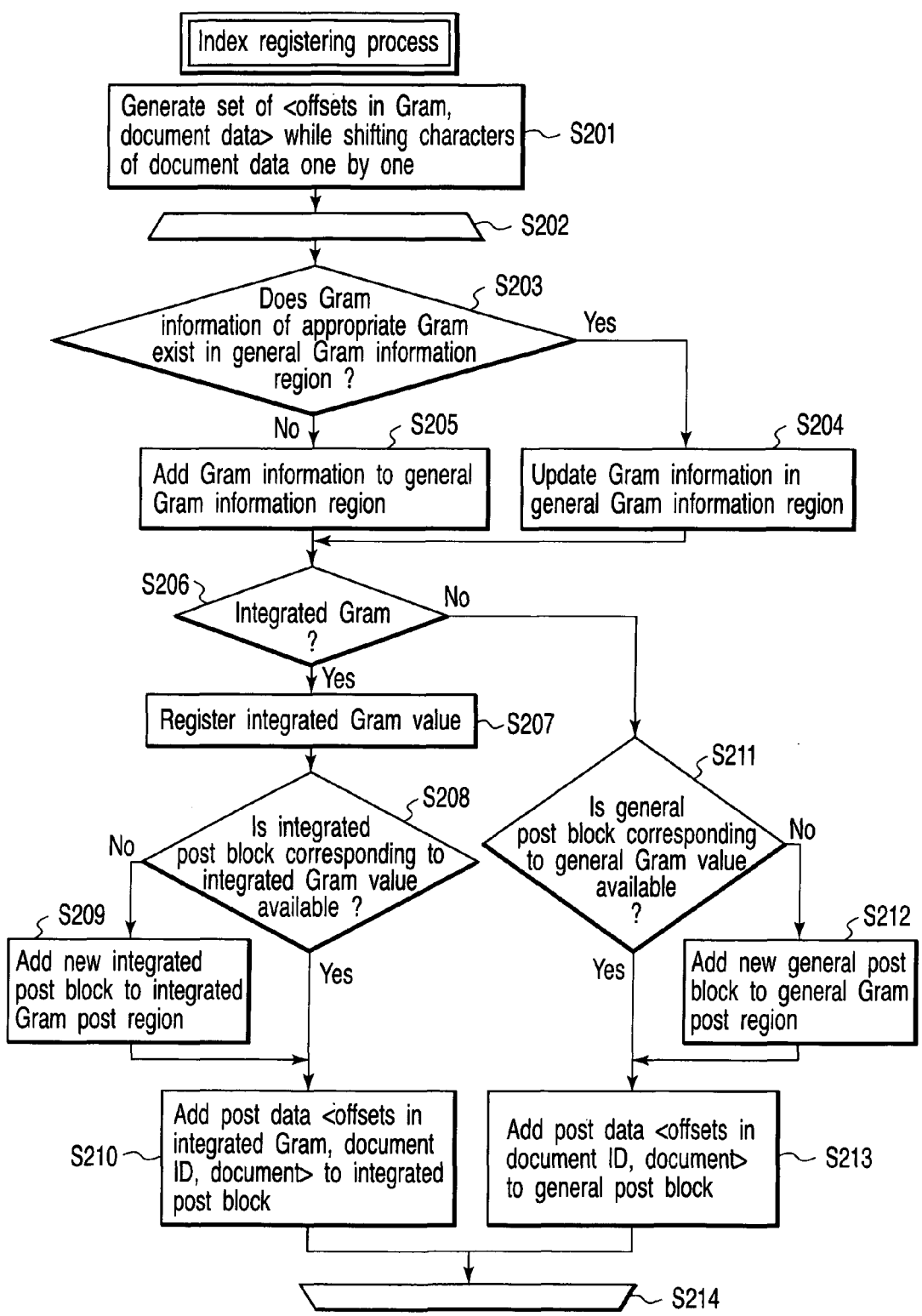
FIG. 6 is a flow chart showing a procedure of an index registering process according to FIG. 5.

The index registration process step S103 is explained referring to FIG. 6. In the index registration process step S103, a set of the Gram and the intra-document offset is generated while shifting the characters of the document data read in step S101 of FIG. 5 one by one (step S201), and the process between steps S202 and S214 is repeated about all Gram and the intra-document offset generated in step S201.

It is checked whether a Gram corresponding to the Gram generated in step S201 exists in the general Gram information region 34 (step S203). If it exists, information on the corresponding Gram in the general Gram information region 34 is updated (step S204). If it does not exist, information on the Gram generated in step S201 is added to the general Gram information region 34 (step S205).

It is determined whether the Grams generated in step S201 is the integrated Gram (step S206). If the generated Gram is determined as the integrated Gram in step S206, the integrated Gram value is calculated, and information on the integrated Gram value is stored in the integrated Gram information region 33 (step S207). Further, it is examined whether the integrated post block corresponding to the integrated Gram value in the integrated Gram post region 35 is available (step S208). If the integrated post block is not available, a new integrated post block is added (step S209).

When an integrated post block is available in step S208, a set of <integrated Gram, document ID and offset> is added to the integrated post block as post data. When it is not available, a set of <integrated Gram, document ID and offset> is added to the integrated post block added in step S209 as post data (step S210).

If it is determined in step S206 that the Gram generated in step S201 is Gram aside from the integrated Gram, namely the general Gram, it is examined whether a general post block corresponding to the general Gram value is available in the general Gram post region 36 (step S211). If the general post-block is not available, a new general post-block is added (step S212).

When the general post block is available in step S211, a set of <document ID and intra-document offset> is added to the general post block as post data. When it is not available, a set of <document ID and intra-document offset> is added to the integrated post block added in step S212 as post data (step S213).

Figure 7:
FIG. 7 is a diagram showing an example of document data to be stored in a data file newly.

Concrete contents of the index data region 31 shown in FIG. 1 are described with reference to FIGS. 7 to 9. It is assumed that document data indicating a character string of ""燃料電池とは"" as shown in FIG. 7, for example, is stored in the data file 13. The document ID:105 is assumed to be assigned to the document data. Five Grams, i.e., ""燃料"", ""料電"", ""電池"", ""池と"" and ""とは"" are clipped from the character string ""燃料電池とは"". The host data composed of the "Gram" <document ID, intra-document offset> is generated for these Grams.

(1) ""燃料"" <105,0>

(2) ""料電"" <105,2>

(3) ""電池"" <105,4>

(4) ""池と"" <105,6>

(5) ""とは"" <105,8>

Figure 8:
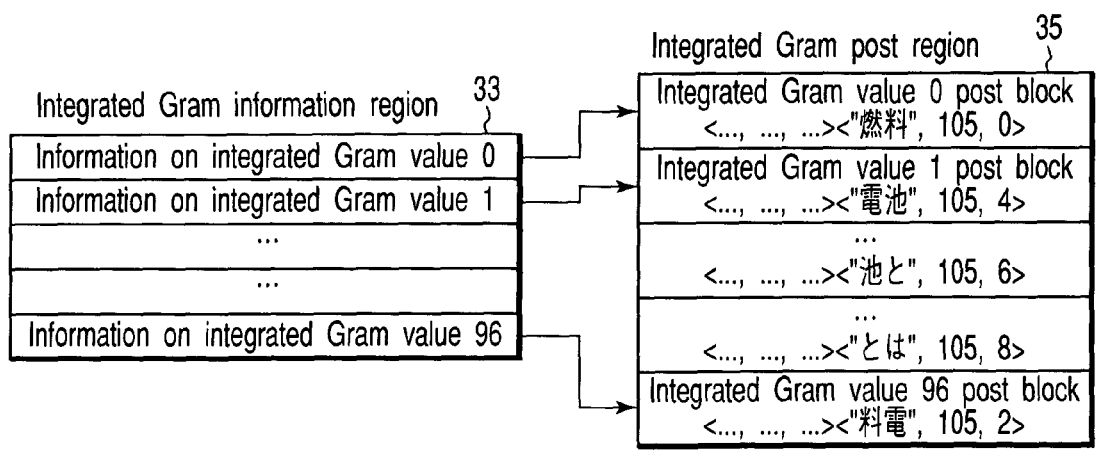
FIG. 8 is a diagram showing a contents example of an integrated Gram information region and an integrated Gram post region when document data of FIG. 7 is input at first.

When each of these Grams is assumed to be the integrated Gram by a reference for determining whether it is the integrated Gram or the general Gram, post-data corresponding to the integrated Gram is stored in the integrated post block of the integrated Gram post region 35 as shown in FIG. 8.

In other words, if a hash value of, for example, ""燃料"" is computed and the integrated Gram value became 0, the post data ""燃料"", 105,0> corresponding to the integrated Gram referred to as ""燃料"" is stored in the post-block of the integrated Gram value 0. Similarly, if a hash value of, for example, ""電池"" is computed and the integrated Gram value became 1, the post data ""電池"", 105, 4> corresponding to the integrated Gram referred to as "nr" is stored in the post-block of the integrated Gram value 1.

Figure 9:
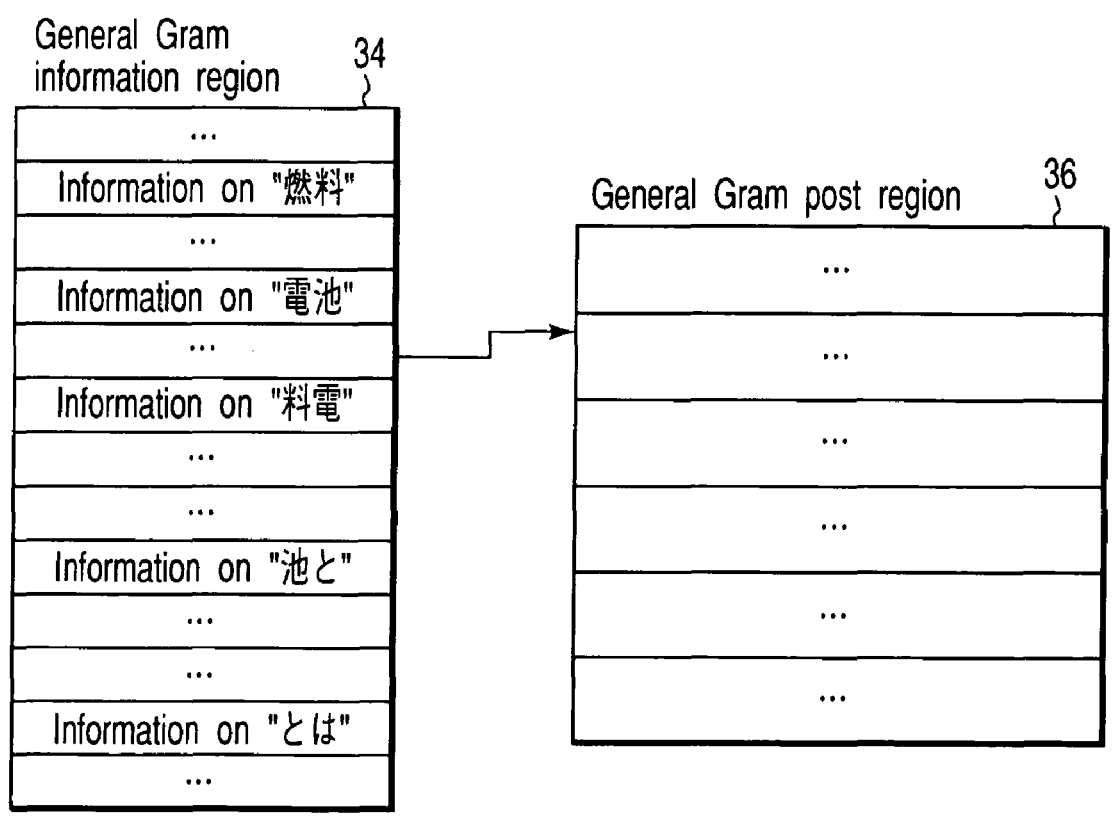
FIG. 9 is a diagram showing a contents example of a general Gram information region and general Gram post region when document data of FIG. 7 is input at first.

On the other hand, in this step, five Grams, i.e., ""燃料"", ""料電"", ""電池"", ""池と"" and ""とは"" all are determined to be the integrated Gram, so that new post-data is not stored in the general Gram post region as shown in FIG. 9.

In the state that document data of a certain number of documents is stored in the document data region 37, document data of the character string of ""燃料電池とは"" is assumed to be stored in the document data region 37 as shown in FIG. 7 again. Then, a document ID:985 different from the previous one is assigned to the document data referred to as ""燃料電池とは"". In this case, five Grams ""燃料"", ""料電"", ""電池"", ""池と"" and ""とは"" are clipped from the character string of ""燃料電池とは"" like the previous example, and the following "Gram" <document ID, intra-document offset> is generated for these Grams.

(1) ""燃料"" <985,0>

(2) ""料電"" <985,2>

(3) ""電池"" <985,4>

(4) ""池と"" <985,6>

(5) ""とは"" <985,8>

Figure 10:
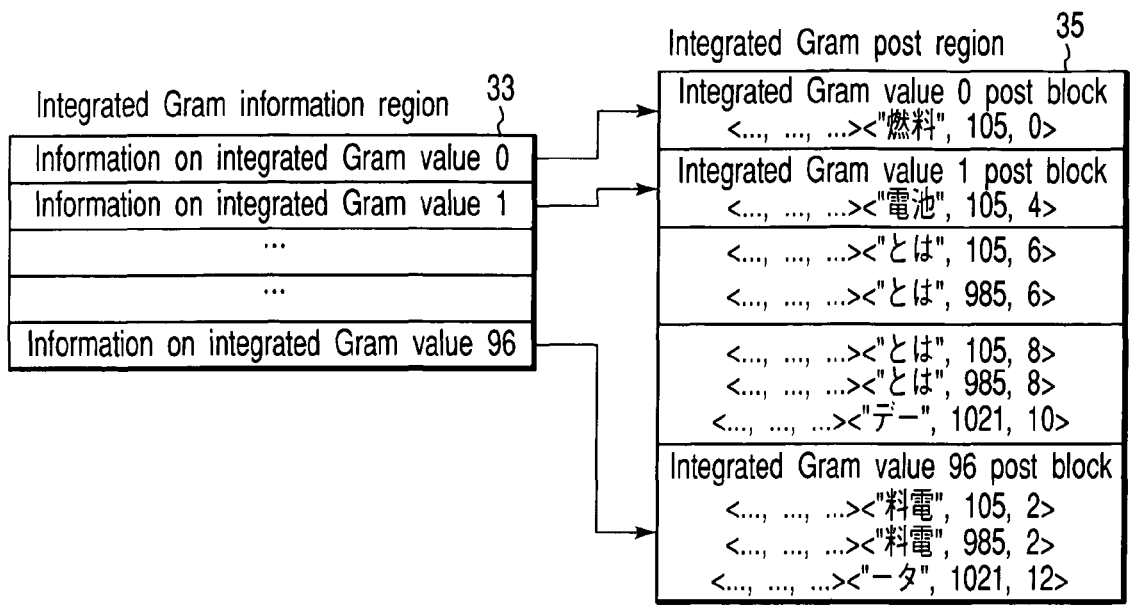
FIG. 10 is a diagram showing a contents example of an integrated Gram information region and an integrated Gram post region when document data of FIG. 7 is input again.
Figure 11:
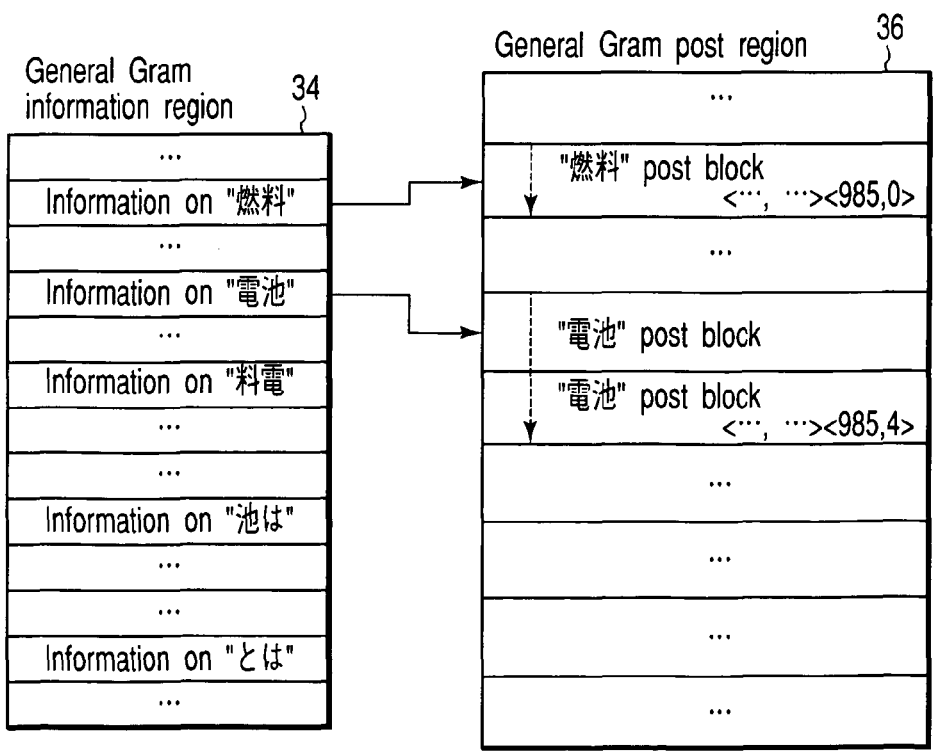
FIG. 11 is a diagram showing a contents example of a general Gram information region and a general Gram post region when document data of FIG. 7 is input again.

By a reference for determining the integrated Gram or the general Gram, the Grams ""燃料"" and ""電池"" of these Grams are determined to be the general Gram, and the Grams ""料電"", ""池と"" and ""とは"" aside from them are determined to be the integrated Gram. In this case, post-data corresponding to the integrated Gram is stored in the integrated post block of the integrated Gram post region 35 as shown in FIG. 10. Further, post data corresponding to the general Gram is stored in the general post-block of the general Gram post region 36 as shown in FIG. 11.

In other words, three Grams of ""料電"", ""池と"" and ""とは"" are determined to be the integrated Gram again, and post data are stored in corresponding post-blocks of the integrated Gram post region 35, respectively. The post-data <985, 0> of ""燃料"" and post data <985,4> of ""電池"" which are determined to be the general Gram are stored in the post-block corresponding to ""燃料"" of the general Gram post region 36 and the post block corresponding to ""電池"" thereof, respectively.

As thus described in the present embodiment, the general Gram of relatively high frequency post data is stored in the general Gram post region 36 in association with information (character string of the general Gram) regarding the general Gram stored in the general Gram information region 34. As for the integrated Gram of relatively low frequency, post data is stored in the integrated Gram post region 35 in association with the integrated Gram value stored in the integrated Gram information region 33. Accordingly, the apparent number of Gram classes is reduced, and a registration time can be shortened. In an additional process of the integrated Gram post as shown in steps S208 and S210 of FIG. 6, since only the integrated post block area of the class defined by V3 has only to be written in the disk, the processing time is shortened remarkably in comparison with a conventional technique of writing in the disk the post-block corresponding to all Gram classes expected to be more than V3.

<Document Retrieval Process>

Figure 12:
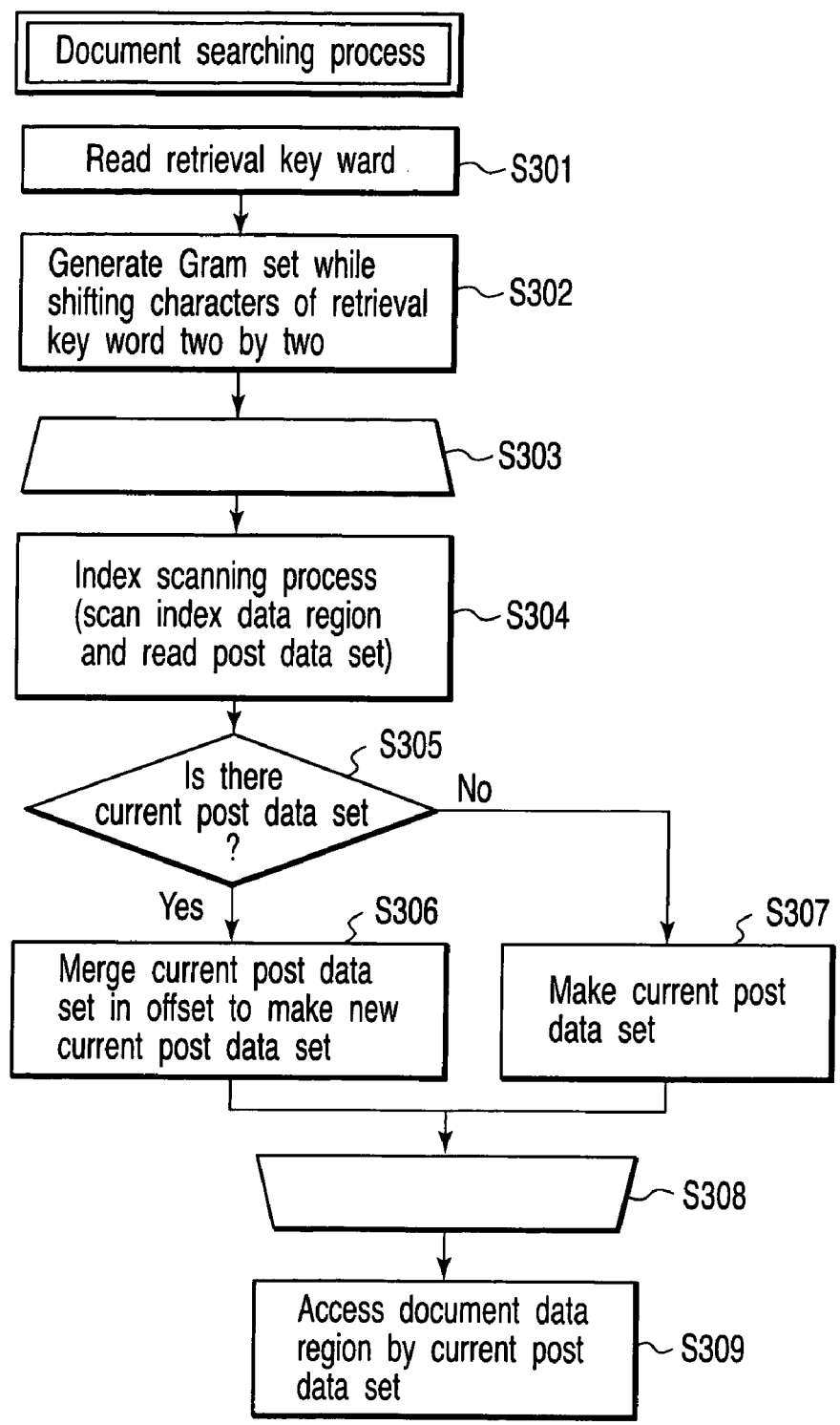
FIG. 12 is a flow chart showing a procedure of a document retrieval process in the embodiment.
Figure 13:
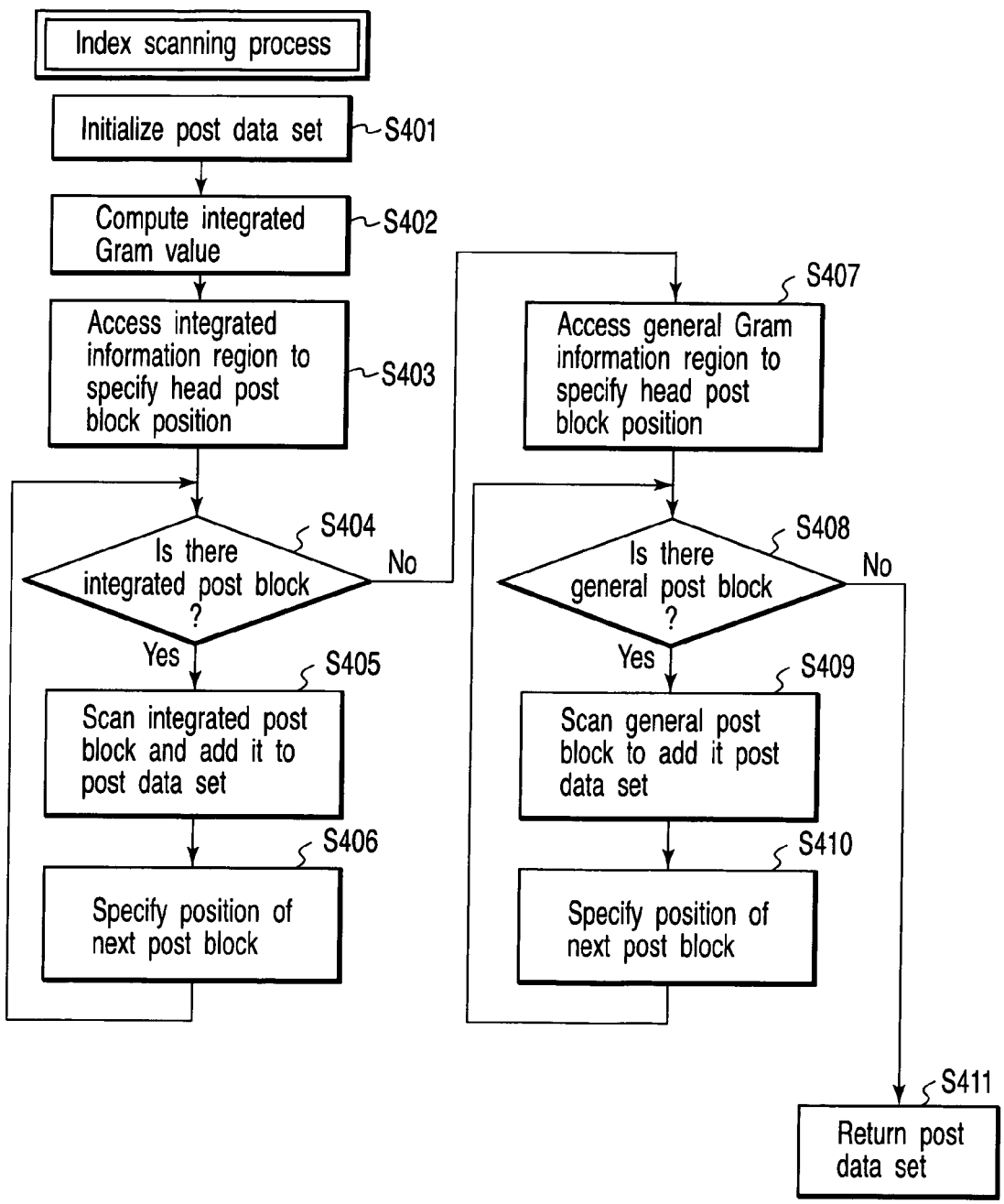
FIG. 13 is a flow chart showing a procedure of an index scanning process of the document retrieval process in the embodiment.

A document retrieval process in the present embodiment is explained referring to FIGS. 12 to 13. A retrieval key word is read as shown in FIG. 12 (step S301), and Grams are clipped from the retrieval key word to produce a Gram set (step S302). The Grams are clipped from the retrieval key word by clipping repeatedly a character string of N characters from the retrieval key word while shifting the characters, for example, one by one.

A process between steps S303 and S308 is repeated for each Gram of the Gram set generated in step S302. In other words, at first in "an index scanning process", the integrated Gram post region 35 of the index data region 31 and the general post region 36 are scanned for each Gram of the Gram set generated in step S302 to derive a post data set from the post block (step S304).

It is examined whether the current post data set exists in the derived post data (step S305). If the current post data set exists, the current post data set and the post-data set derived in step S304 are merged by offset to make a new current post data set (step S306). If there is no current post data set, the post data set derived in step S304 makes a current post data set (step S307).

If the current post data set is provided for all Grams of the Gram set generated in step S302, a set of the document data including the retrieval key word is derived by accessing the document data region 37 by the current post data set (a set of document IDs including the retrieval key word) (step S309).

FIG. 13 shows a concrete procedure of the index scanning process step S305 in FIG. 12. The post-data set derived in step S304 in FIG. 12 is initialized (step S401), and the integrated Gram value is computed (step S402). The integrated Gram information region 33 is accessed by the computed integrated Gram value to derive information on the integrated Gram value, and the head post block position is specified by information of a link to the head post block (step S403).

It is examined whether the integrated post block exists at the head post block position specified in step S403 (step S404). If the integrated post data is at the head post block position, the integrated post block is scanned, the post data set derived in step S304 in FIG. 12 and initialized in step S401 is added to the post-data set stored in the integrated post block (step S405). The next post-block position following the head block position is specified and then the process returns to step S404 (step S406). The process of steps S404 to S406 is repeated till it is determined in step S404 that the integrated post block does not exists at the specified post-block position.

When it is determined in step S404 that there is no post block, the general Gram information region 34 is accessed to derive information on the general Gram value, and the head post block position is specified by information of a link to the head post block (step S407).

It is checked whether the general post block exists at the head post block position specified in step S407 (step S408). If the general post-data exists at the head post block position, the general post block is scanned. To the post data set stored in the general post block is added the post data set derived in step S304 in FIG. 12 and initialized in step S401 (step S409). Subsequently, the post-block position following the head block position is specified (step S410), and then the process returns to step S408. The process of steps S408 to S410 in step S408 is repeated till it is determined that no general post block exists at the specified post block position. The post data set provided by the above-mentioned process is returned to step S305 in FIG. 12 (step S411) and the index scanning process of step S305 in FIG. 12 is finished.

In the index scanning process, the process of steps S402 to S406, namely the process of scanning the integrated post block and adding the post set of the integrated Gram is characterized. In this case, the registration time can be shortened without lengthening a retrieval time by selecting a reference used for determining whether the Gram is the integrated Gram or general Gram adequately.

Figure 14:
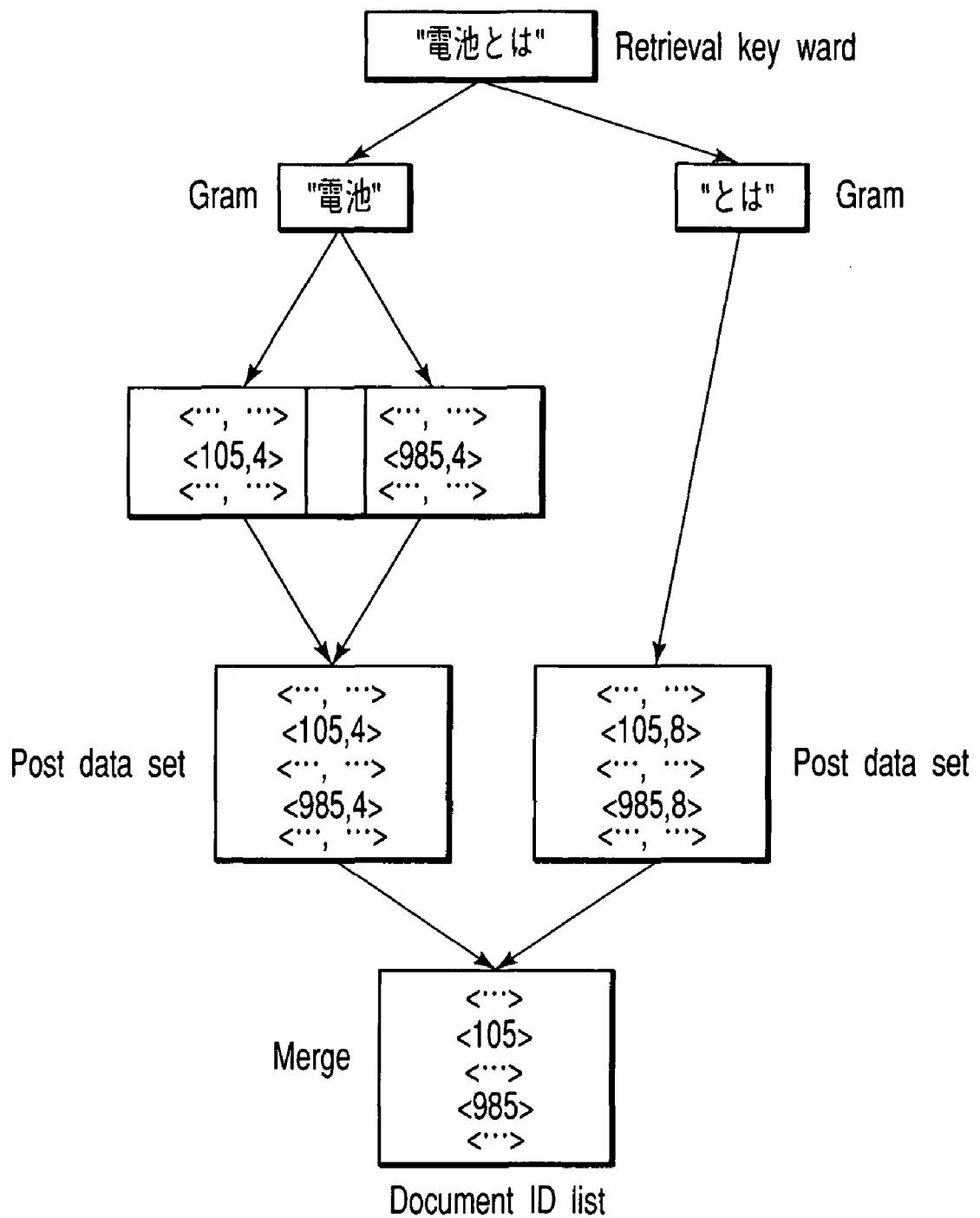
FIG. 14 is a diagram showing a concrete example of a document retrieval process in the embodiment.

The concrete example of the document search process in the present embodiment is explained referring to FIG. 14. In this example, two Grams of ""電池"" and ""とは"" are clipped from the retrieval key ward of ""電池""とは"", and it is determined whether each of these Grams is the integrated Gram or general Gram, and the post-region in which the appropriate post-block is stored is scanned.

Since, for example, ""電池"" is determined to be the general Gram, both of the integrated Gram post region 35 and general Gram post region 36 are scanned. As a result, the following post-data set is provided.

<..., ...>, <105,4>, <..., ...>, <985,4>, <...>.

On the other hand, since ""とは"" is determined to be the integrated Gram, only the integrated Gram post region 35 is scanned.

As a result, the following post-data set is provided.

<..., ...>, <105,30>, <..., ...>, <985,30>, <...>.

These two post-data sets are merged. Since two characters are deviated between ""電池"" and ""とは"", the post data set wherein the difference between the intra-document offsets is +4 is merged according to the post-data <document ID, intra-document offset>. A merge result is <...>, <105>, <...>, <985>, <...>, and this is a document ID list.

The document data region 37 is accessed by the document ID list provided in this way, whereby the document data set including a retrieval key word referred to as ""電池とは"" is acquired as a search result.

According to another embodiment of the present invention, a flag (e.g., a bit string) indicating presence or absence of the integrated Gram corresponding to the integrated Gram value is stored in the integrated post region for every integrated Gram value. When the post-data is read from the integrated post region in document searching, the flag may be checked at the time of scanning the integrated post region to skip the region of the integrated post region where there is no integrated Gram. As a result, the retrieval time can be further shortened.

According to the present invention, the post data is stored in the post region in association with the Gram value for the first Gram of relatively low frequency, and the post data is stored in the post region in association with the character string of the Gram for the second Gram of relatively high frequency. As a result, the apparent number of Gram classes is reduced, whereby a time required for document registration including a document data storage device and a post-data storage can be reduced.

Further, it is possible to shorten a registration time without lengthening a retrieval time by choosing adequately a reference used for determining whether the Gram is the first Gram or the second Gram.

Furthermore, optimum balance can be provided between the retrieval time and the registration time by tuning a Gram determination parameter according to utilization environment (for example, hardware: a memory device, and an application: data size).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document management method for managing document data stored in a document data region of a storage unit, comprising:

shifting a character string of a given number of characters from document data and clipping the character string to generate a management Gram;

in a registration mode, determining that the management Gram is one of a first Gram of relatively low occurrence frequency less than a threshold and a second Gram of relatively high occurrence frequency not less than the threshold;

if the management Gram is determined to be the first Gram, storing first post data in a series in a first post region of a storage unit in association with a Gram value obtained by computing the character string of the first Gram, the first post data being configured with a set of a document identification (ID) indicating document data including the character string of the first Gram and an intra-document offset indicating a position of the character string of the first Gram;

if the management Gram is determined to be the second Gram, storing second post data in series in a second post region of the storage unit in association with the character string of the second Gram, the second post data being configured with a set of a document identification (ID) indicating document data including the character string of the second Gram and an intra-document offset indicating a position of the character string of the second Gram;

in a search mode, obtaining a retrieval Gram;

determining whether or not an occurrence frequency of the retrieval Gram is less than the threshold;

if the occurrence frequency of the retrieval Gram is less than the threshold, scanning only the first post region; and if the occurrence frequency of the retrieval Gram is not less than the threshold, scanning both of the first post region and the second post region, wherein the determining in the registration mode includes determining the management Gram as the first Gram when $Rk(g)<V1$ is satisfied, where V1 indicates a minimum order in order of decreasing occurrence frequency of the management Gram and $Rk(g)$ indicates an order of the management Gram in all management Grams arranged in the order of decreasing occurrence frequency.

2. The document management method according to claim 1, wherein the determining in the registration mode includes determining the management Gram to be the first Gram when $Oc(g)<O\ ave\times V2$ is satisfied, where V2 indicates a value representing a multiple of an average occurrence frequency of Gram for calculating the occurrence frequency of the first Gram in an initial state of beginning to store the document data in the document data region, $Oc(g)$ indicates the occurrence frequency of the management Gram, and $Oave=\Sigma gOc(g)$ indicates an average occurrence frequency of the management Gram.

3. The document management method according to claim 1, further including computing a hash value of the character string of the first Gram to obtain the Gram value.

4. The document management method according to claim 1, wherein clipping the character string includes clipping two Japanese characters from document data of a Japanese document while shifting the character string in units of one character.

5. A document management apparatus including comprising:

a storage unit having a document data region in which document data is stored;

a first determination unit configured to determine, in a registration mode, that a management Gram corresponds to one of a first Gram of relatively low occurrence frequency less than a threshold and a second Gram of relatively high occurrence frequency not less than the threshold, the management Gram being generated by shifting a character string of a given number of characters from the document data of the storage unit and clipping the character string;

a first write-in unit configured to store first post data in series in a first post region of the storage unit in association with a Gram value obtained by computing the character string of the first Gram if the management Gram is determined to be the first Gram, the first post data being configured with a set of a document identification (ID) indicating the document data including the character string of the first Gram and an intra-document offset indicating a position of the character string of the first Gram; and a second write-in unit configured to store second post data in series in a second post region of the storage unit in association with the character string of the second Gram if the management Gram is determined to be the second Gram, the second post data being configured with a set of a document identification (ID) indicating document data including the character string of the second Gram and an intra-document offset indicating a position of the character string of the second Gram;

a generation unit configured to generate a retrieval Gram by shifting a character string of a given number of characters from a retrieval key word clipping the character string, the retrieval key word being used for searching the document data stored in the document data region of the storage unit in a search mode;

a second determination unit configured to determine whether or not an occurrence frequency of the retrieval Gram is less than the threshold;

a first scanner configured to read first post data by scanning only the first post region according to a retrieval Gram value obtained by computing the character string of the retrieval Gram if the second determination unit determines that the occurrence frequency of the retrieval Gram is less than the threshold;

a second scanner configured to read first post data and second post data by scanning both of the first post region and the second post region according to the character string of the retrieval Gram if the second determination unit determines that the occurrence frequency of the retrieval Gram is not less than the threshold; and a search unit configured to search the document data region for document data matching with the retrieval key word using the first post data and the second post data, wherein the first determination unit comprises an order determination unit configured to determine the management Gram as the first Gram when $Rk(g)<V1$ is satisfied, where V1 indicates a minimum order in order of decreasing occurrence frequency of the management Gram and $Rk(g)$ indicates an order of the management Gram in all management Grams arranged in the order of decreasing occurrence frequency.

6. The document management method according to claim 5, wherein the first determination unit comprises an occurrence determination unit configured to determine the management Gram to be the first Gram when $Oc(g)<O\ ave\times V2$ is satisfied, where V2 indicates a value representing a multiple of an average occurrence frequency of Gram for calculating the occurrence frequency of the first Gram in an initial state of beginning to store the document data in the document data region, $Oc(g)$ indicates the occurrence frequency of the management Gram, and $Oave=\Sigma gOc(g)$ indicates an average occurrence frequency of the management Gram.

7. The document management apparatus according to claim 5, further including a computation unit configured to compute a hash value of the character string of the first Gram to obtain the Gram value.

8. The document management apparatus according to claim 5, wherein the first determination unit includes a clipping unit configured to clip two Japanese characters from document data of a Japanese document while shifting the character string in units of one character.

* * * * *